United States Patent

[11] 3,615,586

[72] Inventors Hans-Adolf Rohlfs
Heidelberg;
Wilhelm Koch, Ludwigshafen-Maudach;
Guenther Scheurer, Hassloch/Pfalz, all of Germany
[21] Appl. No. 734,879
[22] Filed June 6, 1968
[45] Patented Oct. 26, 1971
[73] Assignee Benckiser-Knapsack GmbH
Ludwigshafen am(Rhine), Germany
[32] Priority June 13, 1967
[33] Germany
[31] B 92974

[54] PREPARING PROCESS CHEESE
14 Claims, No Drawings
[52] U.S. Cl. .................................................. 99/115, 99/117
[51] Int. Cl. .................................................. A23c 19/00
[50] Field of Search ......................................... 99/54, 115–117, 139

[56] References Cited
UNITED STATES PATENTS
3,075,842  1/1963  Shaver........................  99/117 X
3,329,673  7/1967  Greidinger et al. ...........  99/139 X OTHER REFERENCES
Kosikowski, F., Cheese and Fermented Milk Foods. Edwards Brothers, Inc., Ann Arbor, Michigan, 1966 (page 300) SF 271. K6

Primary Examiner—Lionel M. Shapiro
Assistant Examiner—D. M. Naff
Attorneys—Erich M. Radde, Charles A. McClure, Gerard J. Weiser and Alfred Stapler

ABSTRACT: Process cheese and pasteurized process cheese of superior texture, aroma, and keeping qualities are prepared by melting the starting cheese with a suitable melting salt and a phosphate-modified starch as thickening agent. The amounts of phosphate-modified starch in such process cheese products are between about 0.5 and 3.0 percent and preferably between 1.0 and 2.5 percent and the total amount of melting salt and phosphate-modified starch between about 2.0 and 5.0 percent and preferably between about 2.5 and 4.0 percent

PREPARING PROCESS CHEESE

BACKGROUND OF THE INVENTION

1. Field of the Invention

The present invention relates to improved cheese products and more particularly to process cheese products and pasteurized process cheese products and to a process of preparing same.

2. Description of the Prior Art

Process cheese is prepared by subjecting hard cheese and/or soft cheese to a melting process whereby the starting uncured cheese or mixtures thereof are mixed with certain melting or emulsifying salts and, depending upon their composition, are heated to a temperature between about 80° C. and 95° C. for about 4 to 15 minutes. Thereby, the insoluble paracasein gel is converted into a sol by means of the melting salts.

The primarily used melting or emulsifying salts are alkali metal salts of orthophosphoric acid or polyphosphoric acids or alkali metal citrates. These salts may be used as such or in mixture with each other in amounts between about 3 and 5 percent of the starting cheese. Salts of tartaric acid, lactic acid, trihydroxy glutaric acid, as well as of the amino acids have also been suggested as processing or melting salts. These last-named salts, however, have not become of importance in the preparation of process cheese.

During the last few years the process of heating the starting cheese or cheese mixture to a high temperature has been applied to the manufacture of process cheese. For this purpose the starting cheese or cheese mixture was heated to a high temperature up to about 140° C. for a very short period of time. Thereafter, the resulting molten product was immediately cooled so as to yield a process cheese product substantially free of bacteria and other germs.

Furthermore, attempts have been made to reduce the amount of processing or melting salt by the addition of thickening agents such as carob bean flour, tragacanth, agar-agar, carrageen, alginic acid and its salts, pectic acid and pectins. However, heretofore it was not possible to produce, by the addition of such thickeners, process cheese products of satisfactory consistency, texture, and taste equal to process cheese produced by the addition of phosphates, citrates, and the like melting salts. On the contrary the use of the above-mentioned thickeners has the disadvantageous effect on the quality of the process cheese that such a cheese product in which, for instance, about 0.5 to 1 percent of the melting salt has been replaced by carob bean flour, has a tenacious, puddinglike consistency, loses its cheese aroma to a considerable extent and acquires an off-flavor and off-taste. The more tenacious and more elastic character of the resulting process cheese may be due to the cross-linking reaction of the above-mentioned thickeners with the calcium ions present in the cheese protein whereby elastic, jellylike products are obtained.

SUMMARY OF THE INVENTION

It is one object of the present invention to provide a process of producing process cheese whereby the above-described disadvantages caused by partly replacing the melting salts by thickening agents are avoided and a fully satisfactory process cheese product is obtained.

Another object of the present invention is to provide a processed cheese product with a reduced content of melting salt which is in its properties at least equal to processed cheese produced by means of the conventionally used amounts of melting salts.

A further object of the present invention is to provide a mixture of melting salt and thickening agent which, when added to the starting uncured cheese and melting the mixture, yields a process cheese of fully satisfactory consistency, texture, and taste.

Other objects of the present invention and advantageous features thereof will become apparent as the description proceeds.

In principle the process according to the present invention comprises the use of a conventionally employed melting or emulsifying salt together with phosphate-modified starch to replace part of the melting salt. The addition of phosphate-modified starch as thickener in the manufacture of process cheese avoids all the disadvantages encountered with other thickening agents.

Any phosphate-modified starch as produced heretofore by reaction of starch with various phosphates may be used for the purpose of the present invention. Especially suitable has proved a phosphate-modified starch obtained, for instance, by mixing 100 kg. of corn starch in a kneading device, with a solution of 5.56 kg. of sodium tripolyphosphate ($Na_5P_3O_{10}$) and 4.17 kg. of disodium diphosphate ($Na_2H_2P_2O_7$) in 58 l. of water. The amount of water used for dissolving the phosphates is preferably so low that the starch is merely moistened and not converted into a paste, and is dependent upon the solubility of the phosphates used. Usually amounts between about 50 l. and about 60 l. of water for 100 kg. of starch are sufficient. The resulting moist mixture is dried at a temperature below 60° C. so that it does not glutinize. Preferably the moisture content of such dried phosphate-modified starch does not substantially exceed about 10 percent. The predried starch is then heated to a temperature between about 150° C. and 170° C. Heating is discontinued as soon as the viscosity of the phosphate-modified starch stirred in an amount of 2 percent into distilled water has attained a maximum, i.e. does not increase further. This can readily be determined by taking samples from time to time during heating.

It is understood that not only disodium diphosphate and/or tripolyphosphate but also other polyphosphates can be used for modifying starch. Thus, alkali metal polyphosphates of low, medium, and high molecular weight can be used as reaction components. Preferably the phosphate mixture is composed so that its aqueous solution has a pH-value between about 6.0 and about 7.0. Thus, for instance, 100 kg. of starch may also be reacted with an aqueous solution containing 11 kg. of disodium phosphate ($Na_2HPO_4$) and 5.5 kg. of disodium diphosphate ($Na_2H_2P_2O_7$) or with a solution containing 11 kg. of a sodium polyphosphate ($Na_6P_4O_{13}$) and 5.5 kg. of disodium diphosphate ($Na_2H_2P_2O_7$) or with a solution containing 13.2 kg. of a sodium polyphosphate ($Na_5P_3O_{10}$) and 4.4 kg. of monosodium orthophosphate ($NaH_2PO_4$). In place of the sodium phosphates, there may be used other alkali metal phosphates such as potassium phosphates and lithium phosphates. Sodium orthophosphates and polyphosphates, however, are the preferred alkali metal phosphates. In place of the polyphosphates, there may also be used acid orthophosphates such as monosodium or disodium orthophosphates or their mixtures.

In place of corn starch used for the production of phosphate-modified starch as described hereinabove, there may be reacted other types of starch, such as potato starch, wheat starch, cassava starch, arrowroot starch, rice starch, and others. The preferred phosphate-modified starches are those which contain at least 5 kg. of phosphate (anhydrous) for 100 kg. of starch. A phosphate content of 30 kg. (anhydrous) for 100 kg. of starch should preferably not be exceeded because a higher phosphate content does not further improve the properties of the resulting phosphate-modified starch. Furthermore, a starch with a higher phosphate content becomes discolored on heating to 150°–170° C. In general, a phosphate-modified starch with 10 kg. to 15 kg. of phosphate (anhydrous) for 100 kg. of starch has proved to be fully satisfactory.

The advantageous use of phosphate-modified starch together with the conventionally used melting salts is responsible for the production of process cheese products of excellent quality. Such cheese products have a pastelike consistency, are readily spreadable, have retained the natural cheese aroma, and do not have any off-flavor or off-taste. The quality of the processed cheese is not affected by the manner in which the phosphate-modified starch is added, whether in the dry state or in preswollen form. The amount of phosphate-modified starch is between about 0.5 and 3 percent and preferably between about 1 and 2.5 percent, calculated for the body of cheese to be processed. The total amount of phosphate-modified starch and melting salt is between about 2.0 and 5 percent and preferably between about 2.5 and about 4 percent, calculated for the body of cheese to be processed. Excellent results are achieved with about 2 percent of phosphate-modified starch and with a total amount of phosphate-modified starch and melting salt of about 3.5 percent.

In an analogous manner it is possible to produce process cheese of excellent quality by processing the starting cheese material at a high temperature with the addition of melting salts and phosphate-modified starch.

Thereby, in general a highly fluid product is obtained. Its viscosity can be increased to a viscosity sufficiently high to permit conventional packaging by subsequent heating at a temperature of about 85° C. whereby again melting salt is added. Such a recreaming process with the purpose of increasing the viscosity may also be carried out without the addition of a melting salt.

Process cheese with a high-lactose content as obtained, for instance, when processing whey powder together with the cheese starting material, could not be produced heretofore by the high-temperature-melting process when using the conventionally employed amounts of melting salt. Likewise, high-temperature processing of Emmentaler cheese was also not possible because such starting cheese has a casein texture unsuited to the high-temperature-melting process. The addition of phosphate-modified starch, however, allows to subject such types of cheese to the high-temperature-melting process.

Likewise, the difficulties encountered in preparing process cheese of satisfactory consistency, taste, and appearance from starting cheese to which other milk products or other additions such as meat products, for instance, ham, spices, vegetables, fruits, or sweetening agents are added, are overcome by the addition of phosphate-modified starch.

An especially important advantage achieved by the process according to the present invention is the considerably improved keeping quality of the resulting process cheese. Process cheese products which contain the usual known thickening agents, for instance, carob bean flour, show strong microbial growth when stored for 20 days at a storage temperature of 37° C. Thus they must be considered as spoiled and not suited for human consumption. In contrast thereto process cheese products prepared with the addition of phosphate-modified starch were free of microbial growth even when stored for 30 days under the same temperature conditions and were found not objectionable for human consumption.

DESCRIPTION OF THE PREFERRED EMBODIMENTS

The following examples serve to illustrate the present invention without, however, limiting the same thereto.

EXAMPLE 1

To a mixture of 50 kg. of Cheddar cheese and 50 kg. of Emmentaler cheese there are admixed 1.5 kg. of the melting salt which is a sodium polyphosphate with 59.5% $P_2O_5$ and of a pH-value of 9.1, and 2 kg. of phosphate-modified starch, which has been dispersed in 50 kg. of water and heated to 85° C. for 5 minutes before the addition. The resulting cheese mixture with the melting salt and phosphate-modified starch is molten and processed at 85° C. for 7 minutes while stirring. A smooth, nonropy cheese product which can readily be packaged, is obtained. Half of the resulting process cheese product is homogenized. Both halves are then packaged in aluminum containers which are hermetically sealed.

EXAMPLE 2

The amounts and composition of cheese-starting material and melting salt as well as the procedure are the same as given in example 1. The phosphate-modified starch, however, is replaced by 1 kg. of carob bean flour. A slightly ropy melt is obtained, half of which is homogenized. Both halves are then packaged in aluminum containers which are hermetically sealed.

EXAMPLE 3

The amounts and composition of cheese-starting material and melting salt as well as the procedure are the same as given in example 1, except that the melting salt and 2 kg. of phosphate-modified starch are added in the dry state to the starting cheese. 50 kg. of water are then added and the resulting mixture is molten at 85° C. for 7 minutes while stirring and, thereafter, is homogenized. A smooth process cheese product which can readily be packaged, is obtained. It is packaged in aluminum containers which are hermetically sealed.

EXAMPLE 4

The amounts and composition of cheese-starting material and melting salt as well as the procedure are the same as given in example 3. The phosphate-modified starch, however, is replaced by 1 kg. of carob bean flour. A slightly ropy melt is obtained which is then homogenized and packaged in aluminum containers which are hermetically sealed.

EXAMPLE 5

1.5 kg. of the melting salt used in example 1, 1 kg. of phosphate-modified starch, and 50 kg. of water are admixed to a mixture of 50 kg. of Cheddar cheese and 50 kg. of Emmentaler cheese as described in example 1. The resulting mixture is heated to 130° C. and, as soon as said temperature is reached, is cooled to 95° C. and stirred at said temperature for up to 7 minutes. A smooth process cheese, which can readily be packaged in hermetically sealed aluminum containers, is obtained.

EXAMPLE 6

The amounts and procedure are the same as given in example 5 whereby, however, 1 kg. of carob bean flour is used in place of the phosphate-modified starch. Thereby, a process cheese product of about the same consistency as that of the process cheese prepared according to example 5 is obtained. The product is subsequently packaged in aluminum containers which are hermetically sealed.

EXAMPLE 7

20 kg. of whey powder with a content of 60 percent lactose, 1.5 kg. of phosphate-modified starch, 2.5 kg. of the melting salt as used in example 1, and 60 kg. of water are admixed to a mixture of 50 kg. of Cheddar cheese and 50 kg. of Emmentaler cheese. The resulting mixture is heated to 130° C. and, as soon as said temperature is reached, is cooled to 95° C. and stirred at said temperature for up to 7 minutes. A short, smooth process cheese product which can readily be packaged, is obtained. The product is subsequently packaged in aluminum containers which are hermetically sealed.

EXAMPLE 8

The amounts and procedure are the same as given in example 7 whereby, however, 1.5 kg. of carob bean flour is used in place of phosphate-modified starch. Thereby, a process cheese product of about the same consistency as that of the process cheese prepared according to example 7 is obtained. The product is subsequently packaged in aluminum containers which are hermetically sealed.

The process cheese products obtained according to examples 1 to 8 were organoleptically tested 3 days after their preparation. The results of these tests are given in the following table.

TABLE

| Process cheese prepared according to Example— | Consistency | Taste (Aroma) |
|---|---|---|
| 1a (not homogenized) | Well spreadable, smooth. | Corresponding to its type, fully aromatic. |
| 1b (homogenized) | do | Corresponding to its type, fully aromatic, slightly inferior to cheese product of Example 1a. |
| 2a (not homogenized) | Pudding-like, elastic, not as well spreadable as the cheese product of Example 1a. | Blank, only slightly aromatic and not corresponding to its type, sandy. |
| 2b (homogenized) | About like the cheese product of Example 2a. | About like the cheese product of Example 2a but somewhat less sandy. |
| 3 | Well spreadable | Corresponding to its type, aromatic, slightly sandy. |
| 4 | Of pudding-like firmness, contains partly undissolved thickener particles. | Blank, sandy, slight off-flavor. |
| 5 | Well spreadable | Aromatic, typical cheese flavor. |
| 6 | Firm, pudding like | Blank, flat, slight off-flavor. |
| 7 | Smooth, bright appearance, firm but well spreadable. | Fully aromatic. |
| 8 | Smooth, firm, but spreadable. | Blank, not as aromatic as the cheese product of Example 7. |

These organoleptic tests clearly demonstrate the superiority of process cheese products prepared according to the present invention with the addition of phosphate-modified starch in place of the heretofore used thickeners.

EXAMPLE 9

1.9 kg. of a sodium polyphosphate of a $P_2O_5$ content between 67 and 70 percent, 50 l. of water, and 2 kg. of a phosphate-modified starch are added to a mixture of 50 kg. of Gouda cheese and 50 kg. of Swiss cheese. The resulting mixture is heated to 130° C. After this temperature has been attained, the mixture is immediately cooled to 95° C. and is kept at said temperature for 7 minutes. A smooth process cheese which can readily be packaged, is obtained.

EXAMPLE 10

The procedure is the same as described in example 9, whereby, however, the phosphate-modified starch is replaced by 1 kg. of carob bean flour. The resulting process cheese has a consistency somewhat inferior to that of the cheese obtained according to example 9.

The phosphate-modified starch used in examples 9 is prepared by mixing 100 kg. of corn starch with a solution of 11 kg. of disodium orthophosphate and 5.5 kg. of disodium pyrophosphate in 58 kg. of water, carefully drying the resulting moist mixture, thereby avoiding glutinization, and heating the dried mixture to a temperature of 150°–170° C. until the viscosity of the resulting phosphate-modified starch does not increase further.

EXAMPLE 11

1.7 kg. of a sodium polyphosphate of a $P_2O_5$ content between 60 and 64 percent, 50 l. of water, and 2 kg. of a phosphate-modified starch are added to a mixture of 50 kg. of Swiss cheese and 50 kg. of Cheddar cheese. The resulting mixture is heated to 85° C. for 7 minutes while stirring. Thereafter, the mixture is homogenized. A smooth process cheese, which can readily be packaged, is obtained.

EXAMPLE 12

The procedure is the same as described in example 11 whereby, however, the phosphate-modified starch is replaced by 1 kg. of carob bean flour. The resulting process cheese has a consistency somewhat inferior to that of the cheese obtained according to example 11.

The phosphate-modified starch used in example 11 is prepared by mixing 100 kg. of corn starch with a solution of 11 kg. of sodium tetrapolyphosphate and 5.5 kg. of disodium pyrophosphate in 58 kg. of water, carefully drying the resulting moist mixture, thereby avoiding glutinization, and heating the dried mixture to a temperature of 150°–170° C. until the viscosity of the resulting phosphate-modified starch does not increase further.

EXAMPLE 13

1.7 kg. of a mixture of 30 percent monosodium orthophosphate and 70 percent disodium pyrophosphate, 50 l. of water, and 2 kg. of a phosphate-modified starch are added to a mixture of 50 kg. of Gouda cheese and 50 kg. of Swiss cheese. The resulting mixture is heated to 85° C. for 7 minutes while stirring. Thereafter, the mixture is homogenized. A smooth process cheese, which can readily be packaged, is obtained.

EXAMPLE 14

The procedure is the same as described in example 13 whereby, however, the phosphate-modified starch is replaced by 1 kg. of carob bean flour. The resulting process cheese has a consistency somewhat inferior to that of the cheese obtained according to example 13.

The phosphate-modified starch used in example 13 is prepared by mixing 100 kg. of corn starch with a solution of 10.13 kg. of disodium orthophosphate and 4.35 kg. of monosodium orthophosphate in 58 kg. of water, carefully drying the resulting moist mixture, thereby avoiding glutinization, and heating the dried mixture to a temperature of 150°–170° C. until the viscosity of the resulting phosphate-modified starch does not increase further.

The process cheese products obtained according to examples 9 to 14 were also tested organoleptically 3 days after their preparation. The results of these tests are given in the following table.

TABLE

| Process cheese prepared according to Example | Consistency | Taste (Aroma) |
|---|---|---|
| 9 | well spreadable, smooth | corresponding to its type, fully aromatic |
| 10 | spreadable, somewhat gritty | blank, only slightly aromatic, gritty |
| 11 | well spreadable, smooth | corresponding to its type, fully aromatic |
| 12 | spreadable, slightly puddinglike | blank, only slightly aromatic, slight off-flavor |
| 13 | well spreadable, smooth | corresponding to its type, fully aromatic |
| 14 | spreadable, slightly puddinglike | blank, only slightly aromatic, slight off-flavor |

These tests also demonstrate the superiority of process cheese products prepared according to the present invention with the addition of phosphate-modified starch in place of the heretofore used thickeners.

It is understood, of course, that other cheese varieties than Cheddar cheese, Gouda cheese, and Emmentaler cheese may be used for processing according to the present invention. Similar results are obtained with Chester, Stilton, Swiss, Gruyere, Edam, Colby, Brick, Provolone, Parmesan, Tilsit cheese and other cheese varieties.

It may be pointed out that the melting time is not changed by the addition of phosphate-modified starch. The melting time is about the same as in the conventional manufacture of processing cheese and is between about 4 minutes and about 15 minutes and preferably between about 7 minutes and about 12 minutes depending upon the melting temperature.

Of course, many changes in the type of cheese processed, the composition and amounts of the processing or melting salt, and of the phosphate-modified starch, in the amount of water added, in the processing conditions, temperature, and duration, in the manner in which processing and melting is effected, in the method of working up and packaging the resulting process cheese, and the like may be made by those skilled in the art in accordance with the principles set forth herein and in the claims annexed hereto.

We claim:

1. In a process of producing process cheese products, the step which comprises melting the starting cheese in mixture with a melting salt and, as the sole thickening agent, phosphate-modified starch until the desired texture and other properties are achieved, the amounts of phosphate-modified starch added to the starting cheese being between about 0.5 and about 3 percent.

2. The process according to claim 1, wherein the amounts of phosphate-modified starch added to the starting cheese are between about 0.5 and 3.0 percent and the total amounts of phosphate-modified starch and melting salt are between about 2.0 and 5.0 percent calculated for the total amount of cheese to be processed.

3. The process according to claim 1, wherein the amounts of phosphate-modified starch added to the starting cheese are between about 1.0 and 2.5 percent and the total amounts of phosphate-modified starch and melting salt are between about 2.5 and 4.0 percent calculated for the total amount of cheese to be processed.

4. The process according to claim 1, wherein the amounts of phosphate-modified starch added to the starting cheese are about 2.0 percent and the total amounts of phosphate-modified starch and melting salt are about 3.5 percent, calculated for the total amount of cheese to be processed.

5. The process according to claim 1, wherein the phosphate-modified starch added is a starch produced by reacting starch with phosphates selected from the group consisting of orthophosphates, polyphosphates, and mixtures thereof, drying the thus reacted starch under conditions whereby substantially no glutinization takes place, and then heating the dried reacted starch to a temperature of 150°–170° C.

6. The process according to claim 5, wherein the phosphate-modified starch is obtained by reaction of starch with sodium polyphosphates.

7. The process according to claim 5, wherein the phosphate-modified starch contains between about 5 kg. and about 30 kg. of phosphate, calculated as anhydrous phosphate, for each 100 kg. of starch.

8. The process according to claim 1, wherein the melting salt is an alkali metal salt of an acid selected from the group consisting of orthophosphoric acid, polyphosphoric acid, citric acid, and mixtures thereof.

9. The process according to claim 1, wherein a dispersion of the phosphate-modified starch in warm water is added to the starting cheese.

10. The process according to claim 1, wherein melting is effected at a temperature of about 85° C.

11. The process according to claim 1, wherein melting is effected by first heating the mixture of cheese, melting salt, and phosphate-modified starch to a temperature of about 130° C., immediately cooling the molten mixture to a temperature between about 85° C. and 95° C., and continuing melting at said temperature until the desired texture and other properties are achieved.

12. Process cheese product containing as the sole thickening agent an amount of phosphate-modified starch between about 0.5 and 3.0 percent and a total amount of phosphate-modified starch and melting salt between about 2.0 and 5.0 percent, calculated for the total amount of process cheese.

13. Process cheese product according to claim 12, wherein the phosphate-modified starch contained therein is a starch produced by reacting starch with phosphates selected from the group consisting of orthophosphates, polyphosphates, and mixtures thereof, drying the thus reacted starch under conditions whereby substantially no glutinization takes place, and then heating the dried reacted starch to a temperature of 150°–170° C.

14. Process cheese product according to claim 12, wherein the melting salt contained therein is an alkali metal salt of an acid selected from the group consisting of orthophosphoric acid, polyphosphoric acids, citric acid, and mixtures thereof.